(No Model.)

J. B. M. KEHLOR.
WHEAT SCOURER.

No. 415,275. Patented Nov. 19, 1889.

WITNESSES
S. L. Schrader
W. M. Byrne

INVENTOR
James B. M. Kehlor by
Paul Bakewell,
his attorney (No Model.) 4 Sheets—Sheet 2.
J. B. M. KEHLOR.
WHEAT SCOURER.
No. 415,275. Patented Nov. 19, 1889.
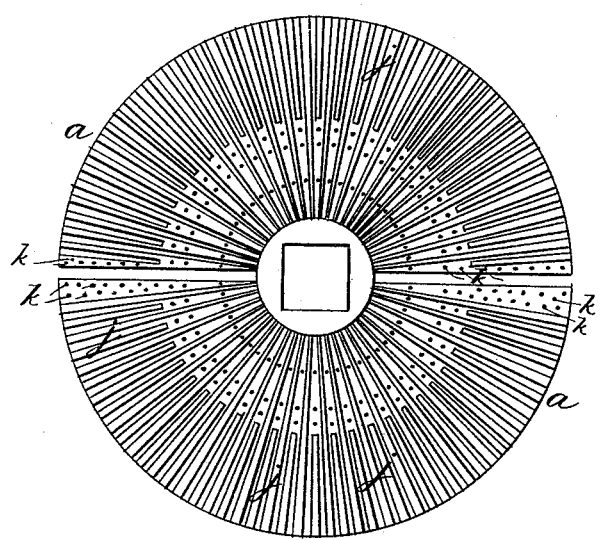
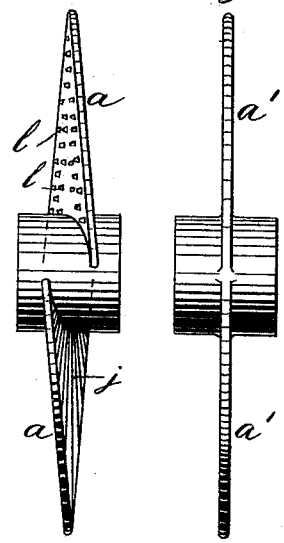
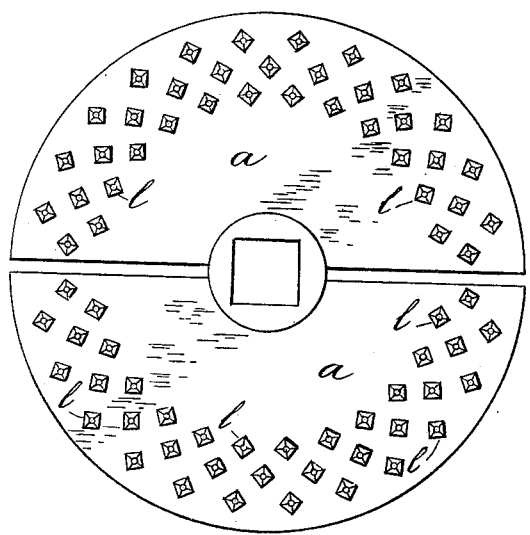
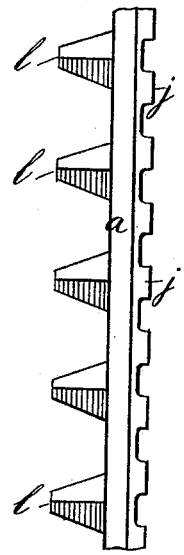
WITNESSES
S. L. Schrader
W. M. Byrne
INVENTOR
James B. M. Kehlor,
Paul Bakewell,
his attorney (No Model.) 4 Sheets—Sheet 3.

J. B. M. KEHLOR.
WHEAT SCOURER.

No. 415,275. Patented Nov. 19, 1889.

WITNESSES
S. L. Schrader.
W. M. Byrne.

INVENTOR
James B. M. Kehlor by
Paul Bakewell,
his attorney (No Model.)
J. B. M. KEHLOR.
WHEAT SCOURER.
No. 415,275.
4 Sheets—Sheet 4.
Patented Nov. 19, 1889.
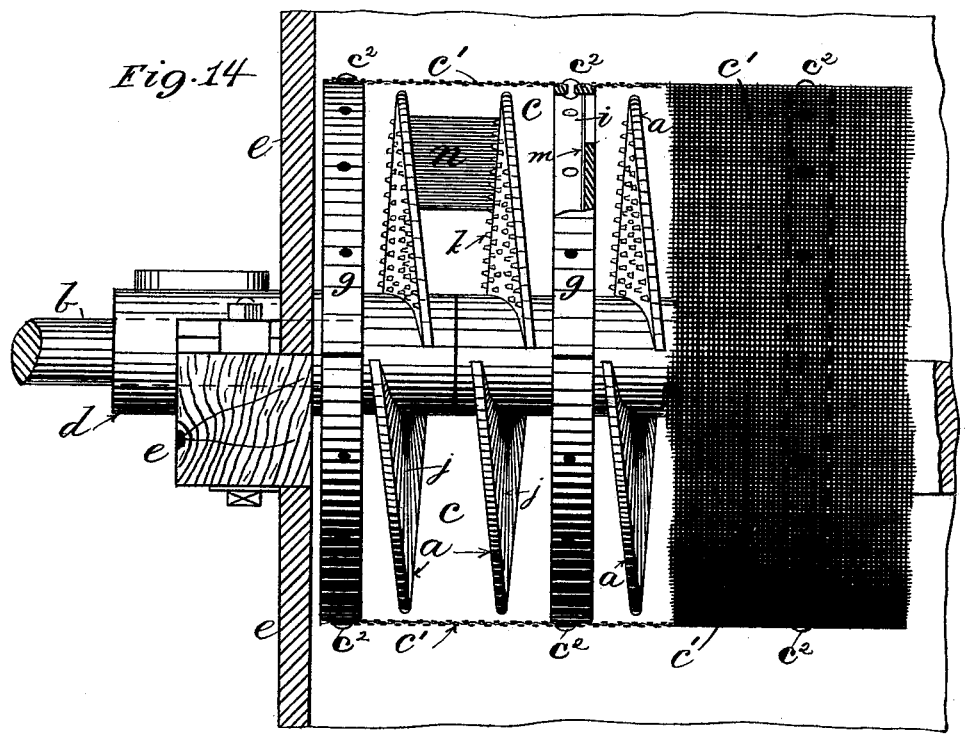
WITNESSES
S. L. Schrader
W. M. Byrne
INVENTOR
James B. M. Kehlor
Paul Bakewell
his attorney.

UNITED STATES PATENT OFFICE.

JAMES B. M. KEHLOR, OF ST. LOUIS, MISSOURI.

WHEAT-SCOURER.

SPECIFICATION forming part of Letters Patent No. 415,275, dated November 19, 1889.

Application filed November 13, 1888. Serial No. 290,685. (No model.)

*To all whom it may concern:*

Be it known that I, JAMES B. M. KEHLOR, a citizen of Great Britain, residing at the city of St. Louis, State of Missouri, have invented a certain new and useful Improvement in Wheat-Scourers, of which the following is a full, clear, and exact description.

My invention relates to improved machinery for scouring wheat, and has for its object to cleanse and remove the husk without injuring the grain.

It consists in a combination of specially-constructed circular plates fixed on a horizontal shaft and revolving within a cylindrical chamber inclosed by a casing of wire-cloth, and provided at intervals with vertical fixed plates for supporting the casing, and through the upper parts of which the wheat on being scoured by the revolving plates is successively delivered from one end of the chamber to the other, whence it is discharged through the top of the casing.

Figure 1:
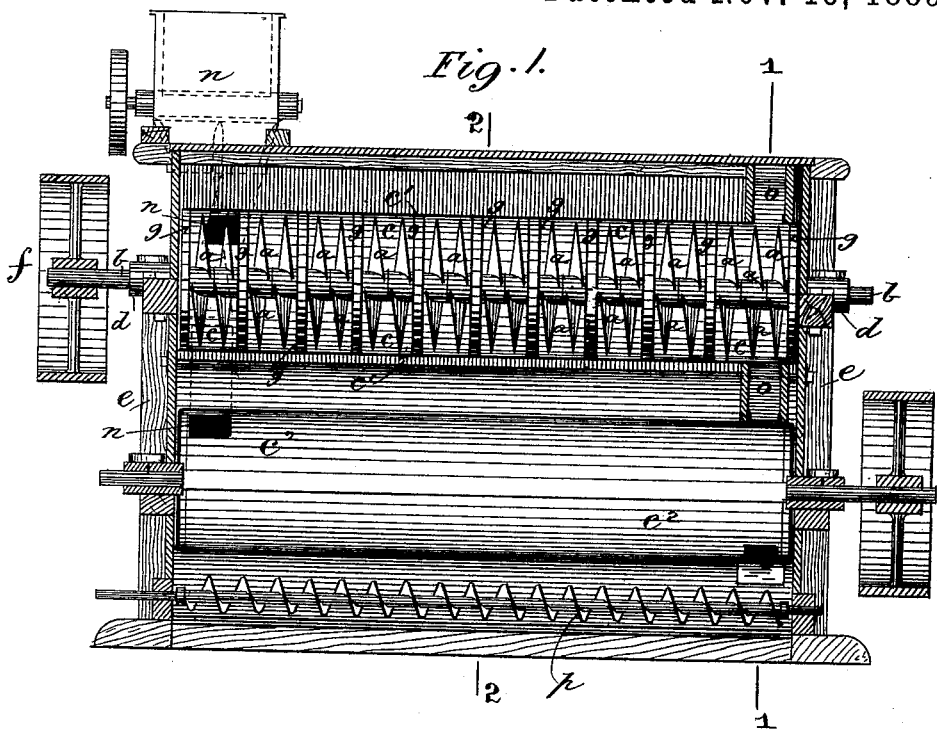
Figure 2:
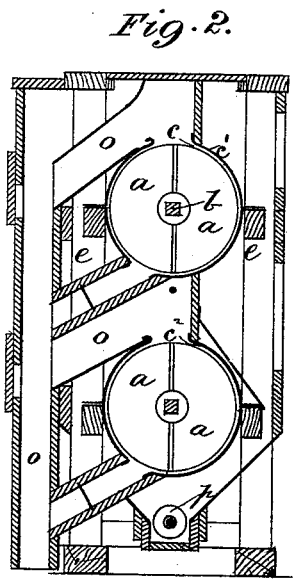
Figure 3:
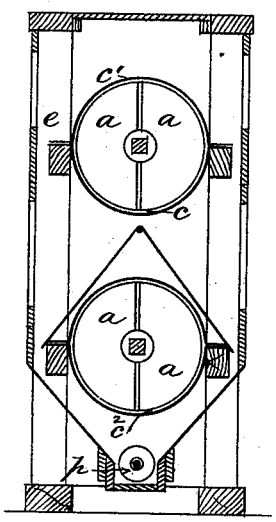
Figure 9:
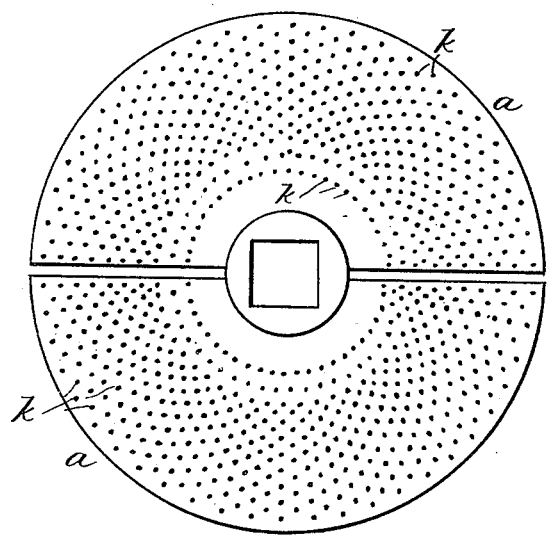
Figure 12:
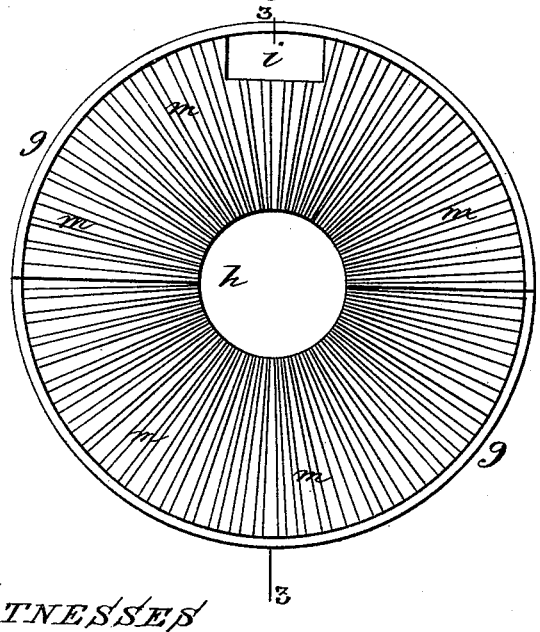
Figure 13:
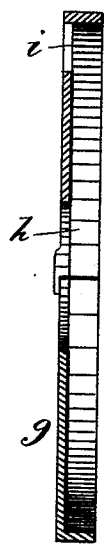

On the accompanying drawings, Figure 1 represents a longitudinal sectional elevation of my improved scourer, taken through the centers of the cylindrical chambers; Fig. 2, a transverse section thereof taken through the discharge-spouts, on line 1 1 in Fig. 1, and Fig. 3 a transverse section taken at the middle of the machine on line 2 2 in Fig. 1; Figs. 4 and 5, front and back views, respectively, of one of the revolving circular plates seen in Fig. 1; Fig. 6, a side view thereof; Fig. 7, a detached edge view thereof, broken away, to an enlarged scale; and Fig. 8, a side view of an alternative form of the plate; Fig. 9, a front view of a modified construction of revolving plate, and Figs. 10 and 11 side views of alternative forms thereof; Fig. 12, a back view of one of the fixed plates seen in Fig. 1; Fig. 13, a transverse section thereof on line 3 3 in Fig. 12; and Fig. 14, a detached sectional view of the rear and feed end of the upper cylindrical chamber and its appurtenances as seen in Fig. 1, on an enlarged scale, broken away.

Like letters of reference denote like parts in the respective figures.

Referring to Figs. 1 to 8, $a\ a$ represent a series of circular disks or plates, each of which is made, preferably, in halves of a helical form around a central hub, whereby the various plates $a$ are fixed side by side upon a horizontal shaft $b$, which extends centrally through a cylindrical chamber $c$, and is mounted beyond each end of the latter in a bearing $d$, carried by the frame-work $e$ of the machine. At one end of the shaft $b$ is fixed a pulley $f$, by which rotation is imparted to the shaft $b$ and plates $a$, as hereinafter more particularly referred to. The casing $c'$ of the chamber $c$ is composed of wire cloth or netting of suitable mesh, (see Fig. 14,) and is preserved in the cylindrical form throughout, so as to leave a certain annular space or clearance around the edges of the plates $a$ by vertical circular plates $g$, which are equal in diameter to the interior of the chamber $c$, and arranged within the latter at suitable distances apart between every one, two, three, or more (or combination of these numbers) of the plates $a$ as found most advantageous, the casing $c'$ of the chamber $c$ being fixed by rivets $c^2$, Fig. 14, to the flanged peripheries of the plates $g$ wherever these occur.

Through the middle of each circular fixed plate $g$ is an opening $h$, Figs. 12 and 13, for the free passage and rotation of the shaft $b$, and through its upper part is a hole $i$, for the passage of the wheat, as presently referred to.

Figure 10:

Each plate $a$ is formed on its face with preferably radially-arranged corrugations or ribs $j$, in combination with depressions or indentations $k$, (see Fig. 4, and partly in Fig. 7,) and on the back with pyramidal or other suitably-shaped studs or projections $l$, Figs. 5 and 7, while on the back of each fixed plate $g$, Fig. 12, are corrugations or ribs $m$, which are similarly arranged and opposed to those on the faces of the plates $a$; or I may use plates $a$ having indentations only on their faces, and without the projections $l$, as shown by Figs. 9 and 10.

Below the chamber $c$ is a second chamber $c^2$, which, being in all respects a duplicate of the foregoing arrangement, needs no further description or illustration.

$n$ and $o$ represent the feed and discharge spouts, respectively, to and from the chamber $c$ and $c^2$.

In operation, the wheat being supplied through the feed hopper and passages $n$, enters the cylindrical chamber $c$ and fills the rear end space therein between the first and second fixed plates $g$. The shaft $b$, being then rotated by its pulley $f$, causes the circular plates $a$ to revolve, and in so doing the corrugations $j$, indentations $k$, and projections $l$ of those plates $a$ occupying the said space, in combination with the corrugations $m$ of the forward second fixed plate $g$, agitate and scour the wheat, and the plates $a$, being of a spiral form, advance and deliver the wheat through the hole $i$ in the top of this fixed plate $g$ into the space or compartment of the chamber $c$, between the second and third fixed plates $g$, where it undergoes a further scouring, and is delivered in a similar manner through the upper hole $i$ of this third plate $g$ into the next space of the chamber $c$, and so on successively through all the spaces of the chamber $c$ until it is finally discharged from the last space at the forward end of the chamber $c$ through the top of the casing $e'$ and through the discharge-spouts $o$ in a perfectly-scoured condition and without injuring the grain, which now takes place to the great deterioration of its yield. Meanwhile the dust and small particles of the husk removed from the grain while being scoured by the plates $a$ and $g$ pass through the meshes of the wire casing $c'$, and are precipitated to the bottom of the machine, from which they are removed by the conveyer $p$.

Figure 11:
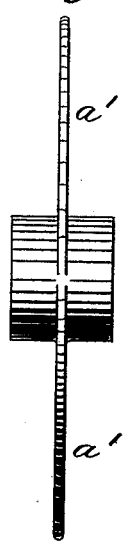

If preferred, in lieu of a helical plate $a$, as above described, I may use a straight plate $a'$, as seen in Fig. 8, its face being formed with corrugations and indentations, and its back with projections (not shown in Fig. 8) similar to the corresponding parts lettered $j$ $k$ $l$, respectively, on the helical plate $a$; or the plate $a'$ may have indentations only on its face and no projections on the back, as in Figs. 9 and 11.

I claim as my invention—

1. In a machine for scouring grain, the combination, with a fixed case, of a series of fixed disks, each of said disks having radial ribs upon its back and a slot or passage at its top, a revolving shaft and a series of helical feed and scouring disks arranged on the shaft alternating with the fixed disks, said helical disks having radial ribs on the face opposed to the ribbed faces of the fixed disks, substantially as and for the purposes described.

2. In a machine for scouring grain, the combination, with a fixed cylindrical screen-case, of a series of flanged disks bolted thereto, said disks having each a set of radial ribs on its back and an overflow-slot, a revolving shaft, and a series of disks arranged on the shaft to alternate with the fixed disks, substantially as and for the purposes described.

3. In a machine for scouring grain, the combination, with a fixed case, of a series of fixed disks, each of said disks having radial ribs upon its back and a slot or passage at its top, a revolving shaft, and a series of helical feed and scouring disks arranged on the shaft alternating with the fixed disks, said helical disks having radial ribs on the face opposed to the ribbed faces of the fixed disks and projections or studs on the reverse side of said disks, substantially as and for the purposes described.

4. In a machine for scouring grain, the combination, with a fixed screen-case having a receiving-port at one end and an overflow-port at the other, of a series of fixed partitions having overflow-openings at the top, said partitions having radial ribs, and a series of helical feed and scouring vanes having radial ribs and indentations on the faces opposed to the ribbed faces of said partitions, substantially as and for the purposes described.

5. In a machine for scouring grain, the combination, with a fixed screen, of a wall or partition having an overflow-slot at the top and a series of radially-arranged ribs, and a helical feed and scouring vane having radial ribs and indentations on the face opposed to the ribbed face of the partition, substantially as and for the purposes described.

6. In a machine for scouring grain, the combination, with a fixed screen-case having a receiving-port at one end and an overflow-port at the other, of a series of fixed partitions having overflow-openings at the top, said partitions having radial ribs, and a series of feed and scouring vanes having radial ribs and indentations on the faces opposed to the ribbed faces of said partitions, substantially as and for the purposes set forth.

In testimony whereof I affix my signature, in presence of two witnesses, this 10th day of November, 1888.

JAMES B. M. KEHLOR.

Witnesses:
SARA L. SCHRADER,
W. M. BYRNE.